US012443664B2

(12) United States Patent
Seth et al.

(10) Patent No.: US 12,443,664 B2
(45) Date of Patent: Oct. 14, 2025

(54) DYNAMIC ELECTRONIC DATA RECORD RESOLUTION IN ELECTRONIC DATA ENVIRONMENTS

(71) Applicant: International Business Machines Corporation, Armonk, NY (US)

(72) Inventors: Abhishek Seth, Deoband (IN); Neeraj Ramkrishna Singh, Bangalore (IN); Geetha sravanthi Pulipaty, Manteca, CA (US); Soma Shekar Naganna, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/206,389

(22) Filed: Jun. 6, 2023

(65) Prior Publication Data

US 2024/0411814 A1 Dec. 12, 2024

(51) Int. Cl.
*G06F 7/00* (2006.01)
*G06F 16/903* (2019.01)

(52) U.S. Cl.
CPC .............................. *G06F 16/90335* (2019.01)

(58) Field of Classification Search
CPC ............................................... G06F 16/90335
See application file for complete search history.

(56) References Cited

U.S. PATENT DOCUMENTS

| 7,403,942 B1* | 7/2008 | Bayliss | G06F 16/215 |
| | | | 707/999.005 |
| 7,698,268 B1* | 4/2010 | Adams | G16H 50/20 |
| | | | 707/765 |
| 8,250,008 B1* | 8/2012 | Cao | G06Q 30/02 |
| | | | 706/14 |

(Continued)

FOREIGN PATENT DOCUMENTS

TW 201902224 A 1/2019

OTHER PUBLICATIONS

Mohammadi, H. H., et al., "A hybrid entity-centric approach to Persian pronoun resolution", Computer Science, Nov. 2022, 27 pages.

(Continued)

*Primary Examiner* — Mohammed R Uddin
(74) *Attorney, Agent, or Firm* — Scully, Scott, Murphy & Presser, P.C.

(57) ABSTRACT

A system for searching and/or linking corresponding electronic data records includes: choosing, for a target electronic data record, a group of candidate electronic data record(s) for comparison; selecting a first set of one or more attributes for comparison between the target record and the group of candidate record(s), and choosing a threshold for the comparisons. The system further includes comparing attribute(s) of the target electronic data record to attribute(s) of the group of candidate records; and scoring the comparison of the attribute(s) of the target electronic data record to the attribute(s) of the candidate records. The system further can (Continued)

include configuring a sieve to apply to electronic records, wherein the sieve has a second set of attribute(s) and a corresponding threshold for each of the second set of attribute(s), and applying the sieve to one or more electronic data records to identify records.

18 Claims, 6 Drawing Sheets

(56) References Cited

U.S. PATENT DOCUMENTS

| | | | | |
|---|---|---|---|---|
| 10,410,225 | B1* | 9/2019 | Johnston | G06F 16/215 |
| 10,489,457 | B1* | 11/2019 | Wulf | G06F 16/24575 |
| 10,585,893 | B2* | 3/2020 | Dantressangle | G06F 16/22 |
| 2007/0276858 | A1* | 11/2007 | Cushman, II | G06F 16/215 |
| | | | | 707/999.102 |
| 2008/0005106 | A1* | 1/2008 | Schumacher | G06F 16/24556 |
| 2008/0243832 | A1* | 10/2008 | Adams | G06F 16/334 |
| | | | | 707/999.005 |
| 2008/0243885 | A1* | 10/2008 | Harger | G06F 16/21 |
| 2009/0089332 | A1* | 4/2009 | Harger | G06F 40/197 |
| 2009/0089630 | A1* | 4/2009 | Goldenberg | G06F 16/2462 |
| | | | | 714/704 |
| 2010/0161566 | A1* | 6/2010 | Adair | G06F 16/2462 |
| | | | | 707/E17.039 |
| 2010/0161603 | A1* | 6/2010 | Caceres | G06F 16/2465 |
| | | | | 707/736 |
| 2011/0238488 | A1* | 9/2011 | Hahn | G06Q 30/00 |
| | | | | 705/14.42 |
| 2012/0095819 | A1* | 4/2012 | Li | G06Q 30/02 |
| | | | | 705/14.23 |
| 2014/0337331 | A1* | 11/2014 | Hassanzadeh | G06F 16/273 |
| | | | | 707/726 |
| 2015/0221045 | A1* | 8/2015 | Heckler | G06Q 40/12 |
| | | | | 705/30 |
| 2018/0113928 | A1* | 4/2018 | Oberhofer | G06N 20/00 |
| 2018/0144003 | A1* | 5/2018 | Formoso | G06N 5/022 |
| 2019/0303371 | A1* | 10/2019 | Rowe | G06F 16/24564 |
| 2021/0034591 | A1* | 2/2021 | Parkala Srinivas | |
| | | | | G06F 16/2379 |
| 2021/0248149 | A1* | 8/2021 | Somani | G06F 40/30 |
| 2022/0164396 | A1* | 5/2022 | Seth | G06F 16/9014 |
| 2024/0104408 | A1* | 3/2024 | Schroeter | G06F 16/285 |

OTHER PUBLICATIONS

Gu, L., et al., "Adaptive Filtering for Efficient Record Linkage", Proceedings of the 2004 SIAM International Conference on Data Mining, 2004, 5 pages.

Bell, D., et al., "Sieve-based Coreference Resolution in the Biomedical Domain", Computer Science, Sep. 2016, 7 pages.

"Quantexa", https://www.quantexa.com/entity-resolution/#chapter-5, printed on Jun. 6, 2023, 36 pages.

"Dynamic Match Analysis Threshold" Informatica Documentation, updated Jul. 28, 2020, 1 page, Abstract only.

Optiz, B., et al., "On-the-fly entity resolution from distributed social media sources for mobile search and exploration", 14th International Conference, Nov. 2015, 1page, Abstract only.

* cited by examiner

| | Record ID | Attr1 | Attr2 | Attr3 | Attr4 | Attr5 | Attr6 | Attr7 |
|---|---|---|---|---|---|---|---|---|
| 301 | R1 | ABC | F | 89 | XYZ | 2900 | NY | R |
| 302 | R2 | - | M | 38 | GIT | 9 | CT | R |
| 303 | R3 | - | F | 93 | ELD | 6384 | FL | L |
| 304 | R4 | - | F | 65 | WJR | 2 | MI | P |
| 305 | R5 | - | M | 57 | - | 19 | LA | W |
| 306 | R6 | - | - | 77 | OIH | 175 | NJ | G |

| | Record From | Record To | Attr Score1 | Attr Score2 | Attr Score3 | Attr Score4 | Attr Score5 | Overall |
|---|---|---|---|---|---|---|---|---|
| 501 | R1 | R2 | 6 | 9 | 4 | 3 | 6 | 28 |
| 502 | R1 | R3 | 2 | 2 | 1 | 5 | | 10 |
| 503 | R1 | R4 | 5 | 4 | 5 | 2 | 7 | 23 |
| 504 | R2 | R3 | 1 | 1 | 3 | 3 | 7 | 15 |
| 505 | R1 | R5 | 1 | 6 | 3 | 2 | 1 | 13 |
| 506 | R7 | R8 | 0 | 6 | 7 | 9 | 6 | 28 |

DYNAMIC ELECTRONIC DATA RECORD RESOLUTION IN ELECTRONIC DATA ENVIRONMENTS

BACKGROUND

The present application relates generally to information handling and/or electronic data processing and analytics, and more particularly to electronic data management and processing in data storage systems storing large volumes of electronic records that involve searching, matching and/or linking electronic data records.

With the advancement of information technology and wide use of storing and processing of electronic data, more and more electronic data is available. Electronic data can be large including millions, multimillions, and hundreds of millions of electronic records and potentially more that are scattered across multiple locations. Reviewing such large volumes of electronic records (e.g., N electronic records) and determining and/or matching duplicates and/or corresponding records would involve $N^2$ comparisons. Performing so many comparisons would be time-consuming and would be difficult to obtain meaningful and timely results. The process of linking corresponding or duplicate records likewise would be time-consuming and difficult to obtain meaningful and timely results. Moreover, if the criterion for linking the electronic records is modified then the time consuming and resource intensive process would need to be repeated. It would be advantageous to have a system and techniques to process electronic data records in an efficient manner to determine matching and/or corresponding records, and optionally linking such records, and it would be further beneficial to be able to use past results, comparisons, or computational work where the criteria for linking records has been modified.

SUMMARY

The summary of the disclosure is given to aid understanding of systems, platforms, tools, computer program products, and/or techniques for searching, matching and/or linking electronic data (e.g., electronic records) in computing environments and not with an intent to limit the disclosure or the invention.

A system, platform, programming product, and computer implemented method are disclosed for searching, determining, matching, and/or linking duplicative or corresponding electronic data records. In one or more embodiments the computer implemented method, system, platform, and/or computer programming product includes: choosing for a target electronic data record, a group of one or more candidate electronic data records for comparison; selecting a first set of one or more attributes of the target electronic data record to compare against a corresponding first set of one or more attributes of the group of one or more candidate data records; and choosing a threshold for each one of the first set of one or more selected attributes of the target electronic data record. In an arrangement, the computer implemented method, system, platform, and/or computer programming product further includes comparing at least one of the first set of one or more attributes of the target electronic data record to at least one of the corresponding first set of one or more attributes of one of the group of one or more candidate electronic data records; and scoring the comparison of the at least one of the first set of one or more attributes of the target electronic data record to the at least one of the corresponding first set of one or more attributes of the one of the group of one or more candidate electronic data records.

In a further aspect the computer implemented method, system, platform, and/or computer programming product can include determining whether the score of the comparison of the at least one of the first set of one or more attributes of the target electronic data record to the at least one of the corresponding first set of one or more attributes of the one of the group of one or more candidate electronic data records is above a first attribute threshold; and storing, in response to the score of the comparison of the at least one of the first set of one or more attributes of the target electronic data record to the at least one of the corresponding first set of one or more attributes of the one of the group of one or more candidate electronic data records being above the first attribute threshold, the score of the comparison of the at least one of the first set of one or more attributes of the target electronic data record to the at least one of the corresponding first set of one or more attributes of the one of the group of one or more candidate electronic data records. The computer implemented method, system, platform, and/or computer programming product in an approach can include linking, in response to the score of the comparison of the at least one of the first set of one or more attributes of the target electronic data record to the at least one of the corresponding first set of one or more attributes of one of the group of the one or more candidate electronic data records being above the first attribute threshold, the target record to the one of the group of one or more candidate electronic data records.

The computer implemented method, system, platform, and/or computer programming product can also include determining a total score of all the comparisons of the selected plurality of the first set of attributes of the target electronic data record to the one of the group of one or more candidate electronic data records; storing, in response to the total score of all the comparisons of the selected plurality of the first set of attributes of the target electronic data record to the one of the group of one or more candidate electronic data records being above a total threshold, the total score; and linking, in response to the total score being above the total threshold, the target record to the one of the group of one or more candidate electronic data records. In an approach, the total threshold is a weighted total threshold where a threshold for at least one of the selected plurality of the first set of attributes is scaled.

The computer implemented method, system, platform, and/or computer programming product includes can further include configuring a sieve to apply to electronic records, wherein the sieve has a second set of one or more attributes and a corresponding threshold for each of the one or more attributes in the second set. The sieve in an embodiment can be applied to one or more electronic data records in an electronic data storage system. Applying the sieve to one or more electronic data records can include in an approach determining, for at least one of the one or more electronic data records, whether each one of the one or more attributes of the second set of one or more attributes is above the corresponding threshold for each of the one or more attributes in the second set. The computer implemented method, system, platform, and/or computer programming product can further include identifying each electronic data record where each one of the one or more attributes of the second set of one or more attributes is above the corresponding threshold set for each of the one or more attributes in the second set.

It can be appreciated that the computer implemented method, system, platform, and/or computer programming product can be used and applied against a plurality of the group of one or more candidate electronic records and/or against all the candidate electronic records in the group.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of methods, techniques, computer program products, platforms, tools, and/or systems for determining, matching, and/or linking duplicate and/or corresponding electronic records and/or data will be better understood when read in conjunction with the figures provided.

Embodiments are provided in the figures for the purpose of illustrating aspects, features, and/or various embodiments of the methods, techniques, products, computer program products, platforms, tools, and/or systems for determining, matching, and/or linking duplicate and/or corresponding electronic records and data, but the claims should not be limited to the precise arrangement, structures, features, aspects, assemblies, subassemblies, systems, platforms, circuitry, functional units, programming, instructions, code, embodiments, methods, processes, or devices shown.

DETAILED DESCRIPTION

Figure 1:
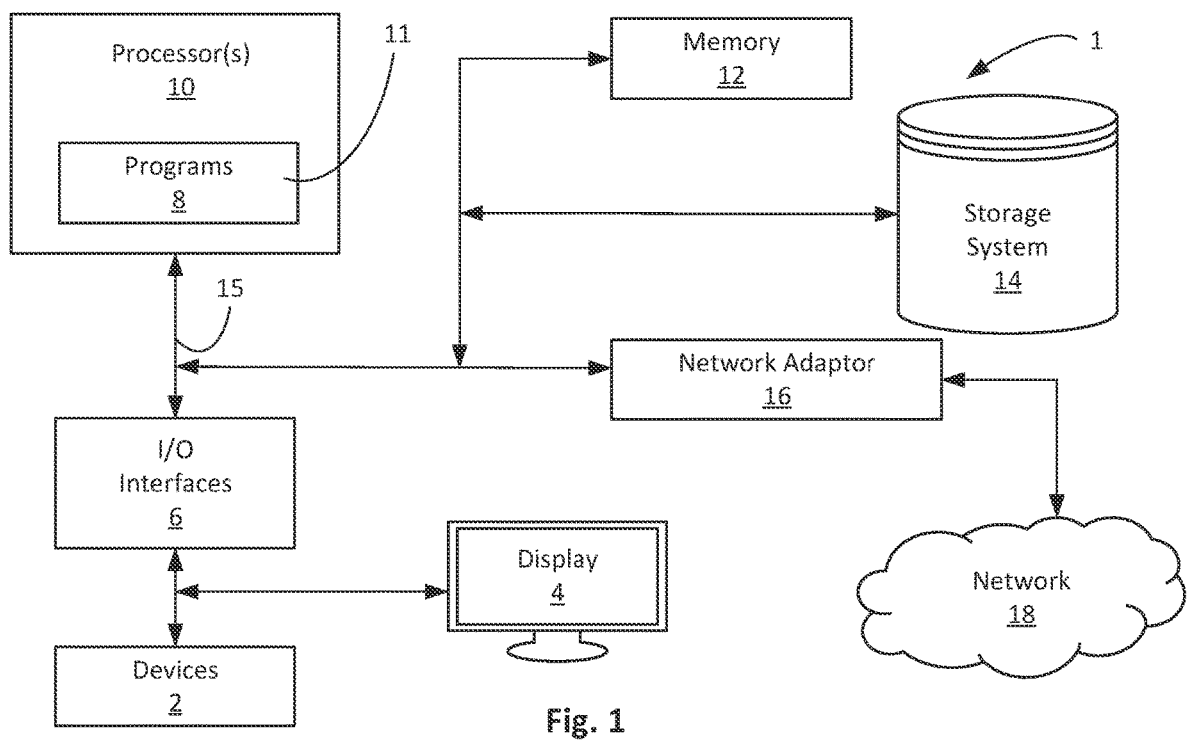
FIG. 1 is an overview block diagram of an exemplary computing environment on which the present disclosure of determining, matching, and/or linking duplicate and/or corresponding electronic records can be practiced according to an embodiment.

The following description is directed to a person of ordinary skill in the art, is made for illustrating the general principles of the invention, and is not meant to limit the inventive concepts claimed herein. In the following detailed description, numerous details are set forth in one or more embodiments in order to provide an understanding of methods, techniques, computer program products, platforms, tools, and/or systems for determining, matching, and/or linking duplicate and/or corresponding records in a computing environment including a data storage system and/or database, however, it will be understood by those skilled in the art that different and numerous embodiments of the methods, techniques, computer program products, platforms, tools, and/or systems may be practiced without those specific details, and the claims and disclosure should not be limited to the arrangements, embodiments, features, aspects, systems, assemblies, subassemblies, structures, functional units, modules, circuitry, programming, instructions, code, processes, methods, and/or details specifically described and shown herein.

In addition, features described herein can be used separately or in combination with other described features in each of the various possible combinations and permutations. Accordingly, variations and modifications may be made to the systems, platforms, tools, computer program products, techniques, and/or methods for determining, matching, and/or linking duplicate and/or corresponding records in a computing environment including an electronic database to achieve different effects. It may be noted that a numbered element in the figures is typically numbered according to the figure in which the element is introduced, is typically referred to by that number throughout succeeding figures, and that like reference numbers generally represent like parts of exemplary embodiments of the invention.

Unless otherwise specifically defined herein, all terms are to be given their broadest possible interpretation including meanings implied from the specification as well as meanings understood by those skilled in the art and/or as defined in dictionaries, treatises, etc. It should also be noted that, as used in the specification and the appended claims, the singular forms "a", "an" and "the" include plural referents unless otherwise specified, and that the terms "includes", "comprises", and/or "comprising," when used in this specification, specify the presence of stated features, integers, steps, operations, elements, and/or components, but do not preclude the presence or addition of one or more other features, integers, steps, operations, elements, components, and/or groups thereof.

Electronic data management systems typically involve searching, matching, and/or linking electronic records as one of its core capabilities. For data management systems to find a duplicative match for a given collection of N electronic records would involve performing $N^2$ comparisons, which would be time consuming and involve huge computational costs, particularly in large data storage systems. To overcome such costs and to decrease the amount of time to check for duplicative or related records, different techniques have been developed. One such technique to reduce computational costs is the use of hashes of only portions of the electronic data records to cut down on the amount of time and number of calculations to perform. Despite the efficiency introduced by this improvement, candidate selection and comparison remain an expensive proposition in terms of time and computational cost.

In some systems, at the end of the comparison, electronic data records are linked if the aggregate score across several comparisons is above a predefined threshold, however, where the aggregate score is below the threshold, the electronic data records are not linked, and the comparison details are lost. The loss of this comparison data means that if the comparison criteria is modified or altered, then the entire process, including the comparisons, must be repeated. It would be advantageous to have a system, platform, computing program product, and/or method to determine, match, and/or link duplicate and/or corresponding electronic data records in a more efficient, quicker manner that uses less computational cost with greater flexibility in modifying the criteria used to match and/or link electronic data records.

Disclosed is a system, platform, device, computer program product, and/or technique to determine, match, and/or link duplicate and/or corresponding electronic records more efficiently, with less time and computational cost, and that in an embodiment saves the precomputed scores and permits modifying and changing the criteria for determining matches and/or corresponding records without redoing all comparisons.

As the disclosure is directed to an improvement in computing technology, the description will start with a discussion of one or more computing environments where the disclosure would be applicable. It should be appreciated that the disclosed computing environments are only examples, and that the disclosure should not be limited to the specific computing environments disclosed. Furthermore, the following discussion omits or only briefly describes the computing environment, including the distributive computing environment, for example cloud computing environment which are apparent to those skilled in the art. It is assumed that those skilled in the art are familiar with computing environments including distributive computing environments, for example cloud computing. It will be appreciated by one of ordinary skill in the art that the improved system, device, technique, and/or program product will have application to large databases containing thousands, hundreds of thousands, millions, and multimillions of electronic data records, and larger systems.

FIG. 1 illustrates an example computing environment 1 including for example a computing device and/or electronic data processing system 1 in which aspects of the present disclosure may be practiced. It is to be understood that the computing environment 1 depicted is only one example of a suitable computing and/or processing system and is not intended to suggest any limitation as to the scope of use or functionality of embodiments of the present invention. For example, the system shown may be operational with numerous other special-purpose computing system environments or configurations. Examples of well-known computing devices, systems, platforms, environments, and/or configurations that may be suitable for use in the present disclosure may include, but are not limited to, server computer systems, mainframe computers, distributed (cloud) computer systems, personal computer (PC) systems, PC networks, thin clients, thick clients, minicomputer systems, handheld or laptop devices, multiprocessor systems, microprocessor-based systems, smart phone, set top boxes, programmable consumer electronics, and the like that include or can access any of the above systems or devices, and the like.

In some embodiments, the computing environment (e.g., computing device and/or system) 1 may be described in the general context of computer executable instructions, embodied as programs or program modules 8 (e.g., computer program product) stored in memory 12, being executed by the computer system. Generally, program modules 8 may include routines, programs, objects, components, logic, data structures, and so on that perform particular tasks and/or implement particular electronic input data and/or data types in accordance with the present invention.

The components of the computing environment 1 may include, but are not limited to, one or more processors or processing units 10, a memory 12, and a bus 15 that operably couples various system components, including memory 12 to processor 10. In some embodiments, the processor 10, which is also referred to as a central processing unit (CPU) or microprocessor, may execute one or more programs or modules 8 that are loaded from memory 12 to local memory 11, where the program module(s) embody software (program instructions) that cause the processor to perform one or more operations. In some embodiments, module 8 may be programmed into the integrated circuits of the processor 10, or loaded from memory 12, electronic data storage device or system 14, network 18 to local memory 11, and/or combinations thereof.

The processor (or CPU) 10 can include various functional units, registers, buffers, execution units, caches, memories, and other units formed by integrated circuitry, and may operate according to reduced instruction set computing ("RISC") techniques. The processor 10 processes electronic data according to processor cycles, synchronized, in some aspects, to an internal clock (not shown). Bus 15 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computing environment or system 1 may include a variety of computer system readable media, including non-transitory readable media. Such media may be any available media that is accessible by the computer system, and it may include both volatile and non-volatile media, removable and non-removable media.

Memory 12 (sometimes referred to as system or main memory) can include computer readable media in the form of volatile memory, such as random-access memory (RAM), cache memory and/or other forms, including non-volatile memory. Computing environment 1 can further include other removable/non-removable, volatile/non-volatile computer system storage media. By way of example only, storage system 14 can be provided for reading from and writing to a non-removable, non-volatile media (e.g., a "hard drive"). Although not shown, a disk drive for reading from and writing to a removable, non-volatile disk, e.g., an optical disk drive for reading from or writing to a removable, non-volatile optical disk such as a CD-ROM, DVD-ROM or other optical media, can be provided. In such instances, each can be connected to bus 15 by one or more data media interfaces.

The computing environment 1 may also communicate with one or more external devices 2 such as a keyboard, track ball, mouse, microphone, speaker, a pointing device, etc.; one or more devices that enable a user to interact with the computer system; any devices (e.g., network card, modem, etc.) that enable the computer system to communicate with one or more other computing devices, and/or one or more displays 4 that present information to a user. Such communication can occur via Input/Output (I/O) interfaces 6. Communications or network adapter 16 interconnects bus 15 with an outside network 18 enabling the computing environment 1 to communicate with other such systems. Additionally, an operating system such as, for example, AIX ("AIX" is a trademark of the IBM Corporation) can be used to coordinate the functions of the various components shown in FIG. 1.

The computing environment 1 can communicate with one or more networks 18 such as a local area network (LAN), a general wide area network (WAN), and/or a public network (e.g., the Internet) via network adapter 16. As depicted, network adapter 16 communicates with the other components of computing environment via bus 15. It should be understood that although not shown, other hardware and/or software components could be used in conjunction with the computing environment 1. Examples include, but are not limited to: microcode, device drivers, redundant processing units, external disk-drive arrays, RAID systems, tape drives, flash drives, solid state drives, and data archival storage systems, etc.

Figure 2:
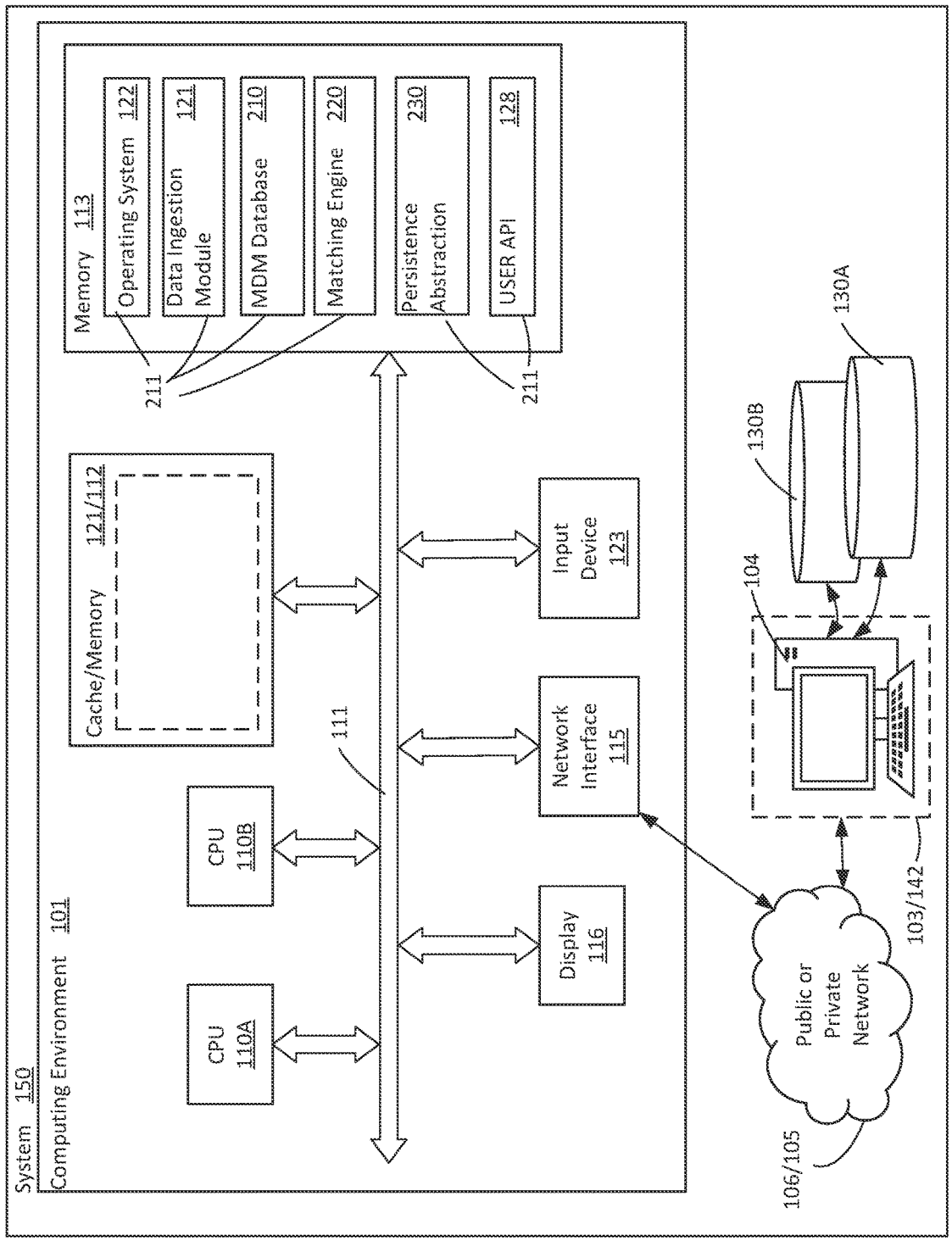
FIG. 2 is an overview block diagram of another exemplary computing environment to implement the present disclosure of determining, matching, and/or linking duplicate and/or corresponding electronic records according to an embodiment of the present disclosure.

FIG. 2 illustrates a system 150, including a computing environment 101, configured and programmed to determine, match, and/or link duplicate and/or corresponding electronic data records preferably in a more flexible manner without introducing huge computational cost. According to an embodiment, computing environment 101 can be referred to as a master node 101, and master node can be part of a computing environment, including a computing system 150, that includes one or more worker nodes or end user devices 103/142. In one or more aspects, computing environment 101 can include, for example, mainframe computers, servers, distributed or cloud computing environments, thin clients, thick clients, personal computers, PC networks, laptops, tablets, mini-computers, multiprocessor-based systems, microprocessor-based systems, smart devices, smart phones, set-top boxes, programmable electronics, or any other similar computing device.

Computing environment or platform 101 can include a cloud-based or distributive server, and can include one or more hardware processors 110A, 110B (also referred to as central processing units (CPUs)), a memory 113, e.g., for storing an operating system, application program interfaces (APIs) and programs, a network interface 115, a display device 116, an input device 123, and any other features common to a computing device, including a server. Further, as part of platform 101, there is provided a local cache/memory 121/112 and/or an attached memory storage device (not shown) for storing electronic data.

In one or more aspects, platform 101 may, for example, be any computing environment or device, including one or more web-based or cloud-based computing devices that are configured to communicate over a public or private communications network 105/106 with one or more user devices 103 (e.g., worker nodes 103). For instance, client user devices 103 can communicate with computing environment 101 where client user devices 103 can include processing resources and memory (e.g., remote server) 104 that includes databases 130A and 130B.

In the embodiment depicted in FIG. 2 processors 110A, 110B may include, for example, a microcontroller, Field Programmable Gate Array (FPGA), or any other processor that is configurable to perform operations according to instructions in software programs as described below. These instructions may be stored, for example, as programmed modules 211 in memory storage 113. Communication channels 111, e.g., wired connections such as data bus lines, address bus lines, Input/Output (I/O) data lines, video bus, expansion busses, etc., are shown for routing signals between the various components of computing environment 101.

Network interface 115 is configured to transmit and receive electronic data or information to and from computing environment 101, e.g., via wired or wireless connections. For example, network interface 115 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 103/142 to transmit electronic information to or receive electronic information from computing environment 101.

Display 116 may include, for example, a computer monitor, television, smart television, a display screen integrated into a personal computing device such as, for example, laptops, smart phones, smart watches, virtual reality headsets, smart wearable devices, or any other mechanism for displaying information to a user. In one or more aspects, display 116 may include a liquid crystal display (LCD), an e-paper/e-ink display, an organic LED (OLED) display, or other similar display technologies. In one or more aspects, display 116 may be touch-sensitive and may also function as an input device. Input device 123 may include, for example, a keyboard, a mouse, a touch-sensitive display, a keypad, a microphone, a camera, or other similar input devices or any other input devices that may be used alone or together to provide a user with the capability to interact with the computing environment 101.

Memory 113 may include, for example, removable/non-removable, volatile/non-volatile storage media for storing electronic data. Memory 113 may include, for example, non-transitory computer readable media in the form of volatile memory, such as random-access memory (RAM), non-volatile memory, cache memory and/or other memory. By way of non-limiting examples only, memory 113 may include a hard disk, a read-only memory (ROM), an erasable programmable read-only memory (EPROM or Flash memory), a compact disc read-only memory (CD-ROM), an optical storage device, a magnetic storage device, a portable computer diskette, a random-access memory (RAM), or any suitable combination of the foregoing.

Memory 113 of computing environment 101 stores one or more modules 211 that include, for example, programmed instructions adapted to determine, match, and/or link duplicate and/or corresponding electronic records. In one embodiment, one of the programmed processing modules stored in memory 113 includes a data ingestion module 121 that provides instructions for employing logic and operating circuitry to access/read large amounts of data for use by other modules 211 that process and/or analyze the electronic data.

In one or more embodiments, computing system 150, including computing environment 101, e.g., memory 113, contains Master Database Management (MDM) database (MDM DB) 210, Matching Engine 220, and Persistence Abstraction 230 to name a few of modules 211 contained in memory 113. It can be appreciated that portions or various modules 211 (including e.g., modules 210, 220, and/or 230) can be distributed throughout computing environment 101 and/or system 150. For example, the electronic data for use by the MDM DB 210, Matching Engine 220, and/or Persistence Abstraction Module 230 can be stored outside Module 210 and/or their respective module and can be distributed throughout computing environment 101 (e.g., Master Node 101) or throughout computing system 150. Similarly, the programs (e.g., software applications/instructions) utilized by the Matching Engine 220 can reside within Matching Engine 220, can be contained within one or more separate modules 211, or be distributed throughout the system 150 and/or computing environment 101.

Computing environment 101 optionally includes a supervisory program having instructions to employ logic for configuring the processors 110, including the servers to call one or more, and in an embodiment all, of the program modules 211 and invoke the operations of system 150 and/or computing environment (master node) 101. In an embodiment, such supervisory program calls provide application program interfaces (APIs) for running the programs. At least one application program interface (API) 128 is invoked in an embodiment to determine, match, and/or link duplicate and/or corresponding electronic records according to the one or more embodiments disclosed herein, including in an embodiment saving the computation results and/or scores of comparisons of electronic data records.

As can be appreciated a computing environment can contain many different forms and types of electronic data. In one or more computing environments hundreds, thousands, hundreds of thousands, millions, tens of millions, and even hundreds of millions of electronic records or more could be saved and stored on the system. These electronic data records typically include a plurality of attributes, where an attribute is a property, characteristic, and/or category to differentiate between different records. Examples of attributes can be the name, address, birth month, birth date, birth year, gender, birth city, employer, or other property. It can be appreciated that the attributes can be further subdivided into additional attributes, for example, name can include first name, middle initial, and last name. It is often advantageous in a computing environment to match and/or link duplicative electronic data records and/or match and/or link corresponding electronic data records. An electronic data record will often be given a unique identifier (e.g., R1, R2, etc.) when input and/or stored in a computing environment (e.g., in a database). The electronic data record might be stored according to its unique identifier and with its corresponding attributes. For example, an electronic record could be saved according to the following columns (e.g., attributes) of data:

Record ID: last name: first name: birth month: birth day: birth year: gender: city: street number: street name: etc.

Figures 3, 4:
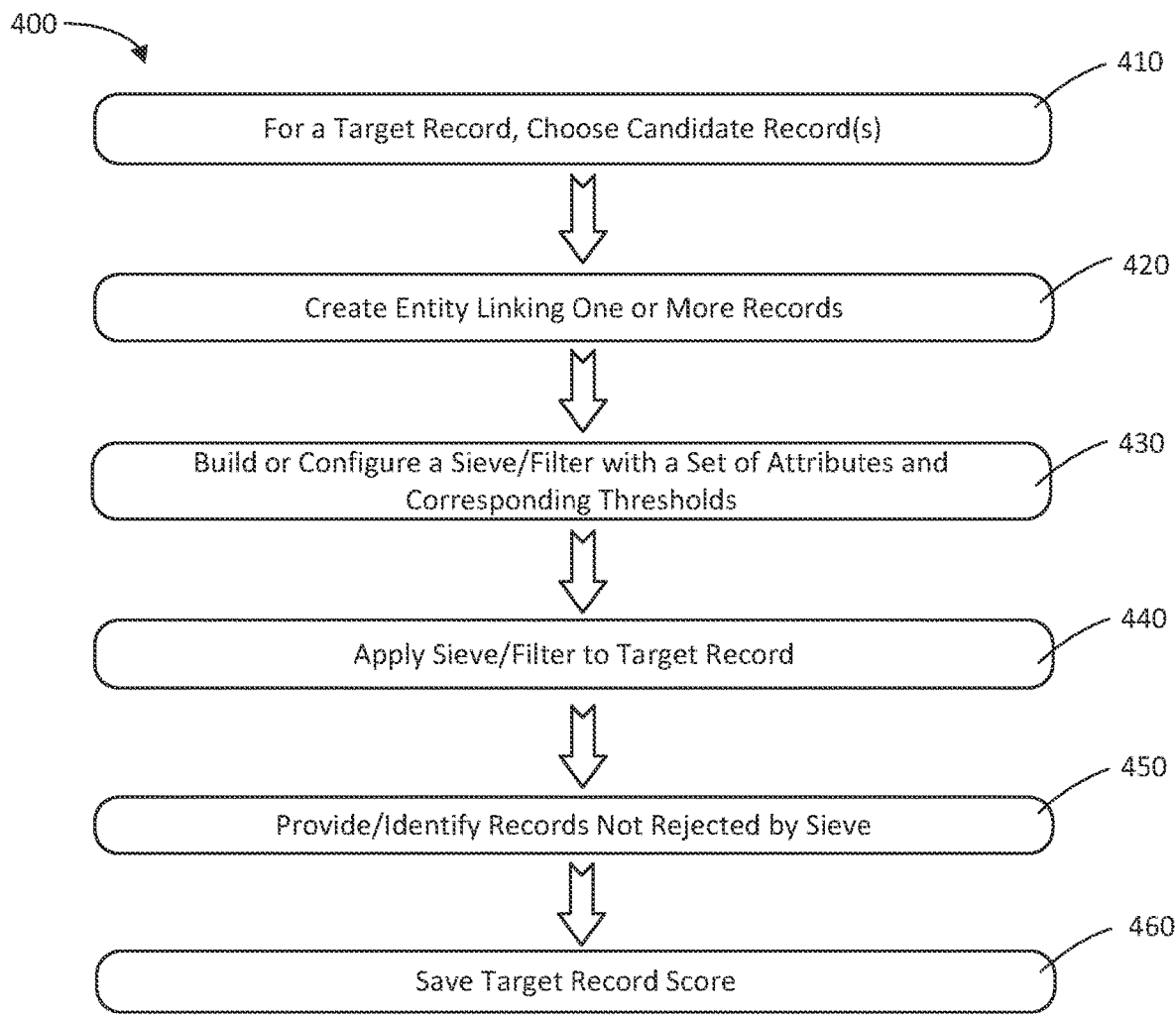
FIG. 3 is an example table in a database containing electronic data records having a plurality of attributes according to an embodiment of the present disclosure.
FIG. 4 is a flow chart showing an overview process of determining, matching, and/or linking duplicate and/or corresponding electronic records in a database according to an embodiment of the present disclosure.

FIG. 3 illustrates an example form in which electronic data records can be saved in an electronic storage system, e.g., a database, in a computing environment. Table 300 for saving and storing electronic records in FIG. 3 includes column 310 that has the unique record identifier, column 312 which contains a first attribute Attr1 or A1, column 314 which contains a second attribute Attr2 or A2, column 316 which contains a third attribute Attr3 or A3, column 318 which contains a fourth attribute Attr4 or A4, column 320 which contains a fifth attribute Attr5 or A5, column 322 which contains a sixth attribute Attr6 or A6, column 324 which contains a seventh attribute Attr7 or A7.

Example table 300 typically includes a row for each record saved, and in FIG. 3 has six rows 301-306. It will be appreciated that the tables or forms in electronic storage system storing electronic data records will containing many more rows (e.g., millions of rows or more), and could contain many different tables for storing the electronic data records. In addition, while example table 300 illustrates seven different columns besides the unique record ID to save data corresponding to the respective electronic data record, it can be appreciated that the table or form of storing electronic data records will generally include many additional columns. Table 300 in FIG. 3 is only one illustrative manner of saving and storing electronic data records in an information handling or computing environment. It can be appreciated that the electronic data records can be stored in computing environment and/or electronic data storage system in many different manners and in many different forms.

To facilitate searching and locating records, the computing environment, e.g., the database, can store hashes of one or more of the record attributes but typically not hashes of all of the record attributes. For example, there may be several attributes, e.g., attributes A1-A7 in Table 300 in FIG. 3, that may be important for record matching (where attributes A1-A7 could be a combination of attributes). For all incoming records, if these several important attributes are present (which will depend upon the system configuration and design), then a hash is generated and stored for each of the attributes for the incoming record. For each newly generated hash, the system looks for existing records which have the same hash (previously generated), which implies that the particular attribute is similar or the same, which could indicate a matching record. These chosen records, e.g., existing records which have the same hash, are referred to as or considered potential matches (candidate records) for the incoming record.

FIG. 4 outlines an exemplary flowchart in accordance with an embodiment outlining and describing an overview method 400 of determining, matching, and in an approach linking, duplicative and/or corresponding electronic data records. The method 400 is described for the sake of convenience and not with an intent of limiting the disclosure as comprising a series and/or a number of steps, it is to be understood that the process 400 does not need to be performed as a series of steps and/or the steps do not need to be performed in the order shown and described with respect to FIG. 4 but the process 400 can be integrated and/or one or more steps can be performed together, simultaneously, or the steps can be performed in the order disclosed or in an alternative order.

In method 400 of matching electronic records, and in an approach of linking electronic records, for an incoming or target electronic record, candidate records are chosen at 410. In this regard, in an embodiment, a candidate record can be chosen as usual. Candidate records in an approach can include all records in the electronic database that have matching hashes of the one or more electronic record attributes discussed above. Candidate records can also be chosen by indexing or techniques of filtering electronic records in a database. Candidate records in an approach can include electronic records related to and/or corresponding to the target or given electronic data record, and in a further approach candidate records can include every other electronic data record in the computing environment, in the data storage system, or subsystem other than the target or given electronic data record. In a preferred embodiment, candidate electronic data records include electronic data records that have already gone through some processing (e.g., comparison of attribute hashes) and are related or correspond to the target or given record (e.g., hash of one or more attributes of the candidate record match the target or given record).

At 420, a loosely connected entity linking one or more electronic records is created. A loosely connected entity is one or more electronic data records, and typically a plurality of electronic data records, that correspond to a given electronic data record based upon a comparison of one or more attributes of the given electronic data record with the corresponding one or more attributes of one or more other records (referred to as a candidate records) meeting a threshold, where the threshold can be fixed, preset, predefined, adjustable, and/or programable. In one or more approaches, if the score of one or more comparisons of the attributes of a candidate record and a target or given record is above a threshold, a soft link is created between the records and stored. This soft linking between electronic data records creates a loosely connected super entity. That is, for a given (e.g., target record), each potential candidate record that scores above a minimum (as represented by the threshold setting) for an attribute can qualify to be in a loosely connected super entity. It can be appreciated that where the threshold is set to zero for each of the attributes, the records in the loosely connected super entity are the same as the candidate records.

It can be appreciated that the attributes selected for comparison between the given or target record and a candidate record can be chosen for example by a user and/or by a program. In an embodiment, if a user does not choose the record attributes, then, for example, the program can use default attributes, and in an alternative embodiment a program can chose the attributes including various sets of default attributes. Similarly, it can be appreciated that the threshold for the comparison score between record attributes can be fixed or adjustable, and in an embodiment are preferably adjustable. In one or more embodiments, the threshold(s) for the comparison score(s) of the one or more attribute(s) for forming a loosely connected entity can be fixed, adjustable, preset, predetermined, and/or programmable. It can further be appreciated that the threshold for one, a plurality, or all the record attributes can be set to zero. It should be noted that a predefined rule is not needed for loosely-connected super entity to be formed.

For example, in an approach, a first selected attribute A1 of a given or target record (R1) is compared and scored against the corresponding attribute A1 of a candidate record (R2) and the score of the comparison of first attributes A1 is checked against a first threshold (T1). If the comparison score of the first attributes for the given record R1 and the candidate record R2 is above the first threshold (T1), then the score can be saved for the first attribute A1 comparison. The process could continue, where a second selected attribute A2 of the given or target record (R1) is compared and scored against the corresponding attribute A2 of the candidate record (R2) and the score of the comparison of second attributes A2 is checked against a second threshold (T2). If the comparison score of the second attributes for the given record R1 and the candidate record R2 is above the second threshold (T2), then the comparison score can be saved for the second attribute A2 comparison. This process of attribute comparison, scoring, and checking against thresholds can continue for the given record R1 and the candidate record (R2) until all the selected attributes have been compared, scored, checked, and appropriately saved.

In a further approach, the attribute total score can be calculated between the given record (R1) and the candidate record (R2) and checked against the total threshold (TT), and if the attribute total (AT) is above the total threshold (TT), then the attribute total (AT) comparison score can be saved. After the given or target record (e.g., R1) is checked against a first candidate record (e.g., R2), the given or target record (e.g., R1) can be compared and scored against a second candidate record (e.g., R30), for example on an attribute-by-attribute basis, until all the selected attributes (including the attribute total) have been compared, scored, checked, and appropriately saved. This comparison, scoring, checking, and saving process between the given or target record can continue until all the candidate records have been processed.

Figures 5, 6:
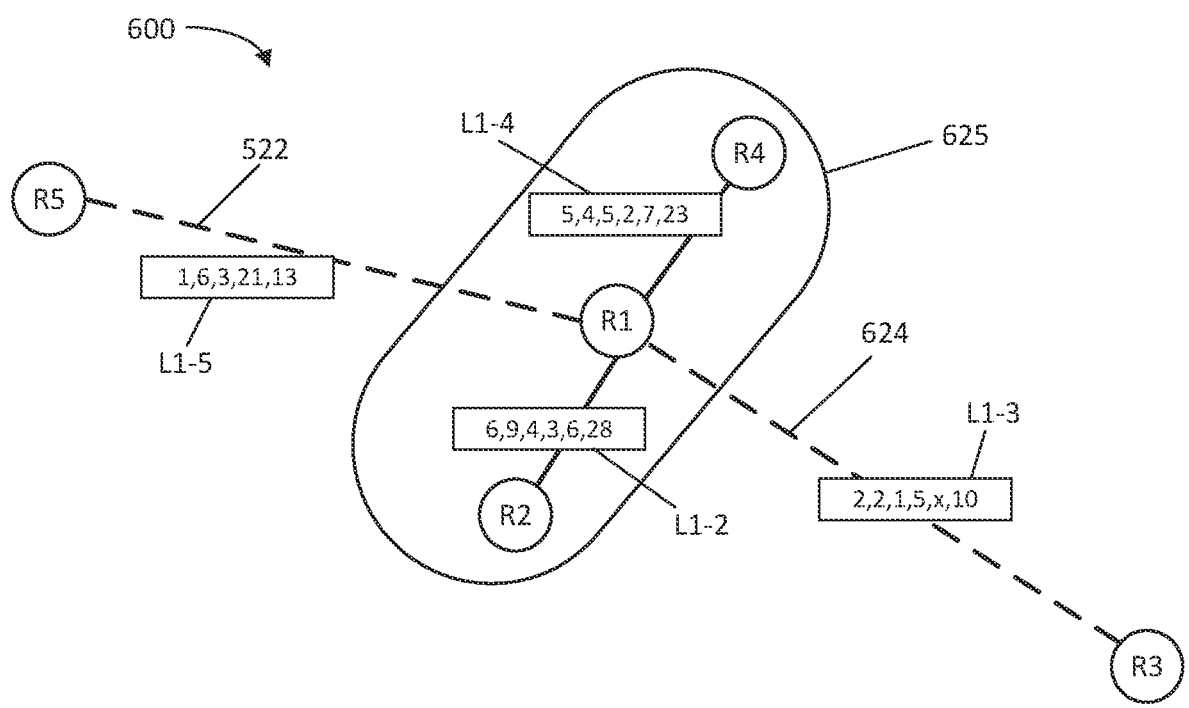
FIG. 5 shows an example table in a database containing attribute scoring between target electronic data records and electronic data candidate records used to determine, match, and/or link duplicate and/or corresponding electronic data records, including the formation of a loosely connected super entity, according to an embodiment of the present disclosure.
FIG. 6 is an example diagrammatic representation of a loosely connected super entity according to an embodiment of the present disclosure.

FIG. 5 is an illustration of how attribute scoring between a target record and a candidate record can be represented and/or saved in the computing environment, e.g., in a database. FIG. 5 shows table 500 containing the scores for the attribute comparisons between attributes A1-A5 in columns 521-525 and the attribute total (AT) score in column 526 between respective electronic records identified by columns 512 and 514. Attributes A1-A5 would be the properties or attributes in the records that would be chosen or otherwise selected (e.g., including default attributes) for comparison and their respective comparison scores would be saved in columns 521-525. Different computing environments, e.g., different databases and/or data storage systems, could use different attributes and a different number of record attributes for comparison and/or linking purposes. Column 512 identified as "Record from" in an embodiment is the target or given record and column 514 identified as "Record to" in an embodiment is the candidate record. The comparison scores (as illustrated in columns 521-525) for the record attributes between the given/target record and the candidate record are stored in each respective column 521-526 in table 500 in the database.

For example, row 501 in table 500 stores the respective scores of the comparisons of attributes A1-A5 between records R1 and R2. That is, column 521 in row 501 shows the comparison score between attribute A1 in record R1 and attribute A1 in record R2. The higher the attribute score the better correlation or match between the records for that attribute. The last column 526 is the total attribute (AT) score which is the sum of all the individual attribute A1-A5 scores (e.g., the sum of columns 521-525). That is, column 526 in row 501 is the summation of all the comparison scores for attributes A1-A5 between record R1 and record R2 from columns 521-525.

It can be appreciated that the total attribute (AT) score in column 526 can be weighted or scaled where not all the individual attribute scores would be given the same weight toward the total sum. In an embodiment scaling or weighting factors can be applied to the individual attribute scores to get the total attribute (AT) score. That is, for each attribute A1-A5 in table 500 the attribute score can be weighted or scaled different amounts when calculating the attribute total (AT) score. For simplicity the attribute total score shown in column 526 in the example table 500 of FIG. 5 is not weighted so the attribute total score is a simple summation of each of the individual attribute scores.

While table 500 in FIG. 5 shows only five (5) attributes A1-A5, and only five (5) attribute comparison scores, it can be appreciated that more or less attributes can be chosen for comparing electronic records. In addition, while the table 500 in FIG. 5 shows only six rows 501-506, it can be appreciated that table 500 can contain more or less rows than illustrated in FIG. 5 and that the table likely contains hundreds, thousands, hundreds of thousands, millions, tens of millions, or more rows containing the attribute scores between records. It can be appreciated that the attribute scoring performed and saved in table 500 is based upon a comparison of a given or target electronic record and one or more candidate record(s). The candidate records for scoring against a given or target record could be filtered so that only a subset of records have the attributes scored, optionally checked against a threshold, and stored, for example in representative table 500. As indicated above, at 410 the candidate record can be chosen based upon indexing, matching attribute hashes for a subset of electronic record attributes, or some other (e.g., rough) filtering technique. It should also be noted that the manner of comparing and scoring attributes between records could be performed based upon known or hereafter developed algorithms for scoring the comparisons.

In an embodiment, for a given or target record, each candidate record that scores at or above the threshold for one of the selected attributes qualifies to be in the loosely connected super entity. In an example, the threshold could be set to zero, so all the candidate records would be part of the loosely connected super entity. This example where the threshold is set to zero might be appropriate where candidate records are sufficiently filtered to start. In FIG. 5, each row in table 500 containing record 1 (R1) in either column 512 or 514 is part of a loosely connected super entity representing R1. In the example table 500 of FIG. 5, a first loosely connected super entity for given or targeted record R1 would include records R2, R3, R4 and R5, as R1 in columns 512 and 514 is located in rows 501-503 and 504 and those rows 501-503 and 505 identify records R2-R5.

It can be appreciated that forming the loosely connected super entities can be based upon numerous different criteria. For example, the loosely connected super entity can be based upon whether: (a) any one attribute comparison between two records scores above its respective, selected thresholds, (b) a plurality of the attribute comparisons between two records score above their respective, selected thresholds, (c) all of the attribute comparisons between two records score above their respective, selected thresholds, (d) only the attribute total between the two records scores above its selected threshold, (e) the attribute total between the two records scores above its selected threshold along with any one attribute comparison between two records scoring above its respective, selected threshold, (f) the attribute total between the two records scores above its selected threshold along with a plurality of attribute comparisons between two records scoring above their respective, selected thresholds, and (g) the attribute total between two records scoring above its respective threshold along with all of the attribute comparisons between the two records scoring above their respective, selected thresholds, to name only a number of the possibilities. This flexibility in forming the loosely connected super entities permits different computing environments to have different criteria in creating loosely connected super entities to provide each computing environment with flexibility to meet their operating goals and performance parameters.

FIG. 6 is a diagrammatic representation of loosely connected supper entity 600 for record R1 and is an example of loosely connected super entity created at 420. Loosely connected super entity 600 in FIG. 6 has record R1 at the center and shows links to records R2, R3, R4, and R5. The distance between the records is the inverse of the overall or total attribute score (e.g., from column 526). That is, the higher the total attribute score, indicative of a closer match between records, the closer the two records are shown. In FIG. 6 the labels L1-2, L1-3, L1-4, and L1-5 provide the attribute scores for attributes A1-A5 and the total attribute score (AT) between the given/target record R1 and the loosely connected records R2-R5 respectively. Loosely connected super entity 600 in FIG. 6 can be referred to as loosely connected super entity or super entity R1 as record R1 is the given or target record and the candidate records R2-R5 are each connected to record R1.

Turning back to method 400 and FIG. 4, during a search for matching records and/or at runtime to determine whether there are matching records in the database, at 430 a multi-dimensional sieve or filter is built, configured and/or created. The multi-dimensional sieve is based upon one or more attributes and typically a plurality of attributes. The set of attributes, including the number of attributes and the particular attributes, are selected typically by a user. That is, a user running a search for matching records typically inputs the attributes for the search which defines the attributes used in building the multi-dimensional sieve at 430. While in the above embodiment a searcher/user of the system will select the attributes for determining matching records, it is contemplated that the attributes can be predefined, preset, fixed, defaulted, adjustable, and/or programmable. That is, in an embodiment the attributes can be set by a program.

The multi-dimensional sieve is also typically based upon setting thresholds for the respective attributes, preferably, but not necessarily, a different threshold for each attribute. The threshold for each of the attributes can be selected by a user. That is, a user running a search for matching records can input the threshold for each of the attributes for the search, which defines the threshold for each of the attributes used in building the multi-dimensional sieve at 430. While in the above embodiment a searcher/user of the system selects the threshold for each of the attributes for determining matching records, it is contemplated that the thresholds for one, a plurality, or all of the attributes can be predefined, preset, fixed, defaulted, adjustable, and/or programmable. When building the sieve at 430, in an approach the attributes are selected, which would identify the number N of attributes, and the sieve would be built and/or created based upon N+1 attributes, where an additional attribute would be the attribute total (AT) score. It can be appreciated that defining/selecting the various attributes (the number of attributes and the selected attributes) and the thresholds for the various attributes can change and modify the sieve that is built at 430. The sieve built at 430 would represent the new rule for entity formation.

At 440, after building the multi-dimensional sieve at 430, the sieve is applied to a given or target electronic data record. In an embodiment, the given record refers to the record provided as input by the user. For example, the given record could be based upon a search or based upon an incoming record. In an approach, a search can turn up a record and a user can request the entity view of that record. The target record in one or more embodiments is one of the records from the loosely connected supper entity and/or the candidate records. For example, where the threshold is set to zero all the candidate records would be part of the loosely connected super entity. In an embodiment, if the target electronic data record via comparison with the given record scores less than the threshold for any of the attributes in the multi-dimensional sieve (referred to as the second threshold to differentiate over the earlier (first) threshold used/created in response to generating/linking the loosely-connected super entity), the record is rejected (e.g., the record passes through the sieve/filter and is not a match). In an aspect, the sieve can be applied to a given record such that for every record where the attribute comparison scores at or above the threshold, the record is not rejected. That is, in an approach, if even one attribute comparison scores at or above the threshold, the record is not rejected.

Figure 7:
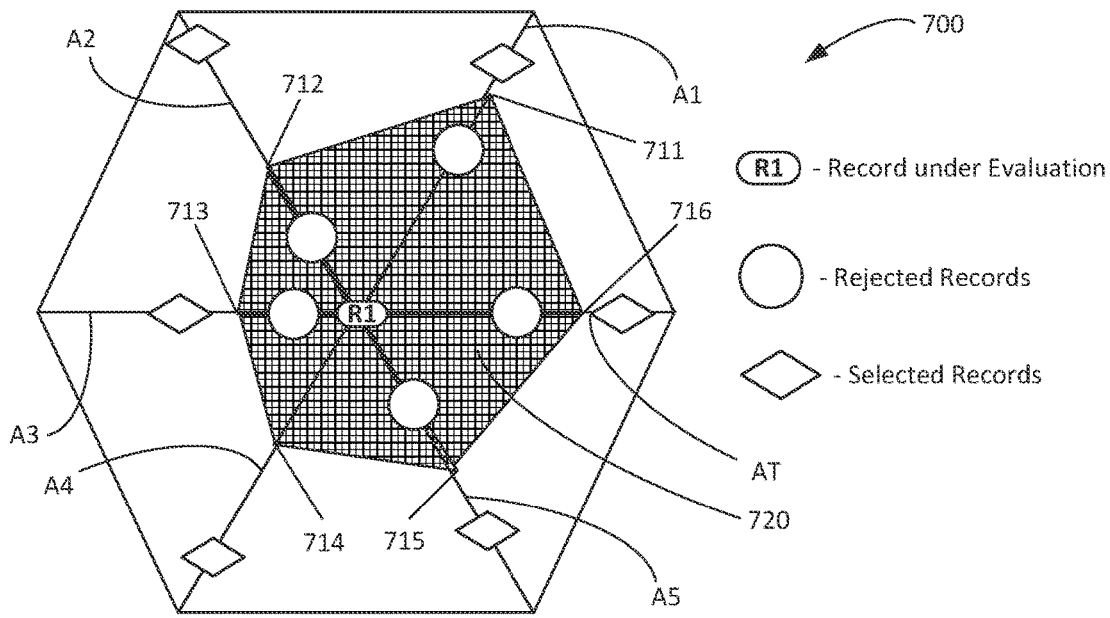
FIG. 7 is an example diagrammatic representation of a multi-dimensional sieve being applied to a target electronic record according to an embodiment of the present disclosure.

FIG. 7 illustrates a diagrammatic illustration of a multi-dimensional sieve or filter 700 applied to a target record R1.

Multi-dimensional sieve 700 has five attributes, attributes A1-A5 indicated by axes emanating radially outward from the targeted record R1. Sieve 700 further includes attribute total AT indicated by a further axis emanating from target record R1. The thresholds for the record attributes are illustrated in multi-dimensional sieve 700 on each of the attribute axes. The threshold 711 for attribute 1 (A1) is illustrated along axis A1, the threshold 712 for attribute 2 (A2) is illustrated along axis A2, the threshold 713 for attribute 3 (A3) is illustrated along axis A3, the threshold 714 for attribute 4 (A4) is illustrated along axis A4, the threshold 715 for attribute 5 (A5) is illustrated along axis A5, and the threshold 716 for attribute total (AT) is illustrated along axis AT. The records that do not meet the threshold for the attribute are rejected and are within the cross hatched section 720 of the diagram of FIG. 7 along the respective attribute axis. The intersection of records on every attribute axis forms the entity (e.g., the group of records) that are of interest (e.g., meet the sieve/search criteria) and match the attribute threshold criteria.

As an example of applying the multi-dimensional sieve at 440, if a user wants to get an entity view of "R1", the API call (which defines the multi-dimensional sieve) may look like:

Example 1: getEntityViewForRecord (R1, "{attribute1::5, attribute2::7, overall::20} which would mean return the entityView for record R1, where the score for the candidates is higher than 5 for attribute 1, higher than 7 for attribute 2, and overall attribute score is higher than 20. Referring to Table 500 in FIG. 5, R1 would have candidates R2-R5 and the returned entity by applying the multi-dimensional sieve would contain R1 and R2 because only R2 qualifies for all the conditions. R3, R4 and R5 would not be part of the entity view as they don't qualify for one or more conditions or parameters of the multi-dimensional sieve.

As a further example of applying the multi-dimensional sieve, if the API call (which defines the multi-dimensional sieve) looks like:

Example 2: getEntityViewForRecord (R1, "{attribute1::5, attribute2::3, overall::20} which would mean return the entityView for record R1, where the score for the candidates is higher than 5 for attribute 1, higher than 3 for attribute 2, and overall attribute score is higher than 20, the returned entity view would include candidates R1, R2 and R4. Referring to Table 500 in FIG. 5, R1 would have candidates R2-R5 and the returned entity by applying the multi-dimensional sieve would contain R1, R2, and R4 because R2 and R4 qualifies for all the conditions, whereas R3 and R5 would not be part of the entity view as they don't qualify for one or more conditions or parameters of the multi-dimensional sieve.

In one or more embodiments, during the matching phase where the sieve is applied to the given record at 440, some of the candidate records would score so high that they would be strongly connected and form a default entity. This default entity could be determined by having all the individual attribute scores being above a set threshold and/or the attribute total (AT) score being above a set or defined threshold. In the example of loosely connected super entity 600 in FIG. 6, target record 1 (R1) and candidate records R2 and R4 form default entity 625, illustrated by a solid line between R1-R2 and R1-R4. The remaining candidate records R3 and R5 remain loosely connected, shown by dotted lines 622 and 624 in FIG. 6, and form part of loosely connected super entity 600.

At 450 the records that are not rejected by the sieve are provided and/or identified, for example to a user (e.g., displayed on a screen). That is, records that do not pass through the sieve (i.e., score at or above the threshold for at least one attribute, a plurality of attributes, for each individual attribute, and/or for the attribute total (AT) score, depending upon how the sieve is built/configured) are provided/identified. In an embodiment, the records that are not rejected by the sieve can be provided and/or identified on an attribute-by-attribute basis (e.g., the subset of records that meet the threshold for attribute 1 can be provided/identified, the subset of records that meet the threshold for attribute 2 can be provided/identified, etc.). It will be appreciated that the sieve can be built with flexibility, and preferably is built and applied such that only the records that are at above the threshold set for all of the attributes, including in an approach the weighed attribute total threshold, are provided and/or identified at 450. In an aspect, the target record score is saved at 460. The target record score can be saved on an attribute-by-attribute basis (including the attribute total score) or only the attribute total score.

Method 400 is advantageous in that it preserves (e.g., saves) the pre-computed scores and those scores are used repeatedly with different sieves where the attributes and the thresholds can be varied, modified, and/or adjusted. By modifying the attributes for the sieve, the thresholds for the attributes, and the weighting of the individual attributes in determining the attribute total (AT), a lot of different analyses can be performed to see how the entity and/or records change with varying attributes, different thresholds for the various attributes, and different weights of the various thresholds in calculating the attribute total (AT). For example, the sieve can be created, dimensioned, built, and applied to select records related to R1 that have an overall or total weighted attribute score more than a given threshold T using the default weights applied to the individual attribute scores. Alternatively, or additionally, the sieve can be created, dimensioned, built, and applied to select records related to R1 that have an overall, weighted score more than a given threshold T using weights W1, W2, W3, . . . WN applied to the individual attribute scores. In a further example, the sieve can be created, dimensioned, built, and applied to select records related to R1 that have an individual score for each individual attribute that is above thresholds T1, T2, T3, . . . TN, and has an overall or attribute total (AT) score above the threshold based upon the summation of the individual attribute thresholds.

Figure 8:
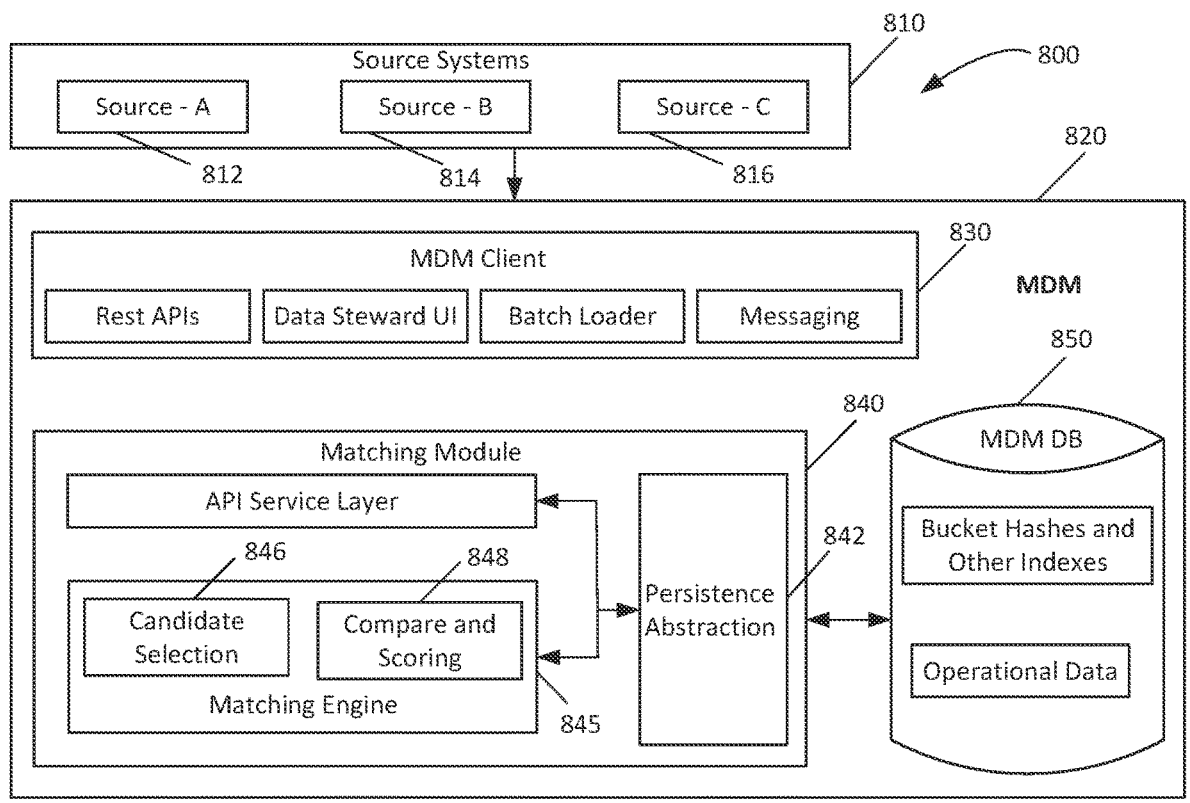
FIG. 8 shows an example diagrammatic representation of Master Data Management system or platform containing modules for determining, matching, and/or linking duplicate and/or corresponding electronic data records according to an embodiment of the present disclosure.

FIG. 8 diagrammatically illustrates system or platform 800 which in one or more embodiments can apply method 400 to determine, match, and/or link duplicate and/or corresponding electronic records. Platform 800 includes source systems 810 containing electronic records connected to master data management (MDM) module 820. Source systems 810 supply MDM module 820 with electronic records for processing, including for searching for matching and/or corresponding electronic records. Source systems 810 are shown as having three sources of electronic data (e.g., electronic data records): Source A 812, Source B 814 and Source C 816. More or less sources of electronic data can be included in source systems 810. Source systems 810 contain many electronic records which could amount to hundreds, thousands, millions, tens of millions and more electronic data records.

Master Data Management Module 820 includes one or more modules including MDM Client Module 830, Matching Module 840, and MDM Database 850. Each of MDM Client Module 830, Matching Module 840, and MDM Database 850 provides and/or contains instructions for employing logic and operating circuitry to perform their respective functions as described herein. In an embodiment, MDM DB 850 can be MDM Database 210, and matching Module 840 can contain Matching Engine 220 and Persistence Abstraction 230.

In Master Data Management Module 820, MDM DB 850 interacts and interfaces with Matching Module 840. Persistence Abstraction Module 842 in Matching Module 840 processes and provides the data supplied by MDM Database 850 in a format that can be used by Matching Engine 845. Matching Engine Module 845 contains Candidate Selection Module 846 and Compare and Scoring Module 848. In an embodiment, matching Engine 845 can be matching Engine 220. As can be appreciated Candidate Selection Module 846 contains instructions for employing logic and operating circuitry to select candidate records for processing, while Compare and Scoring Module 848 contains instructions for employing logic and operating circuitry to compare records and compute the attribute scores as described herein.

MDM DB Module 850 contains bucket hashes and/or other indexes used to select and provide candidate records or otherwise provide filtering to the electronic data records. MDM DB Module 850 in an embodiment would also contain the table and associated data created when processing electronic data records including storing the attribute scoring, as well as storing the loosely connected super entities and the optional default entities. For example, MDM DB 850 would store the data illustrated in Table 500, and in an arrangement would contain one or more Tables 500. While Master Data Management Module 820 is illustrated as containing MDM Client Module 830, Matching Module 840, and MDM Database 850 it can be appreciated that other architectures and arrangements can be provided, and more or less modules can be provided in MDM Module 820.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
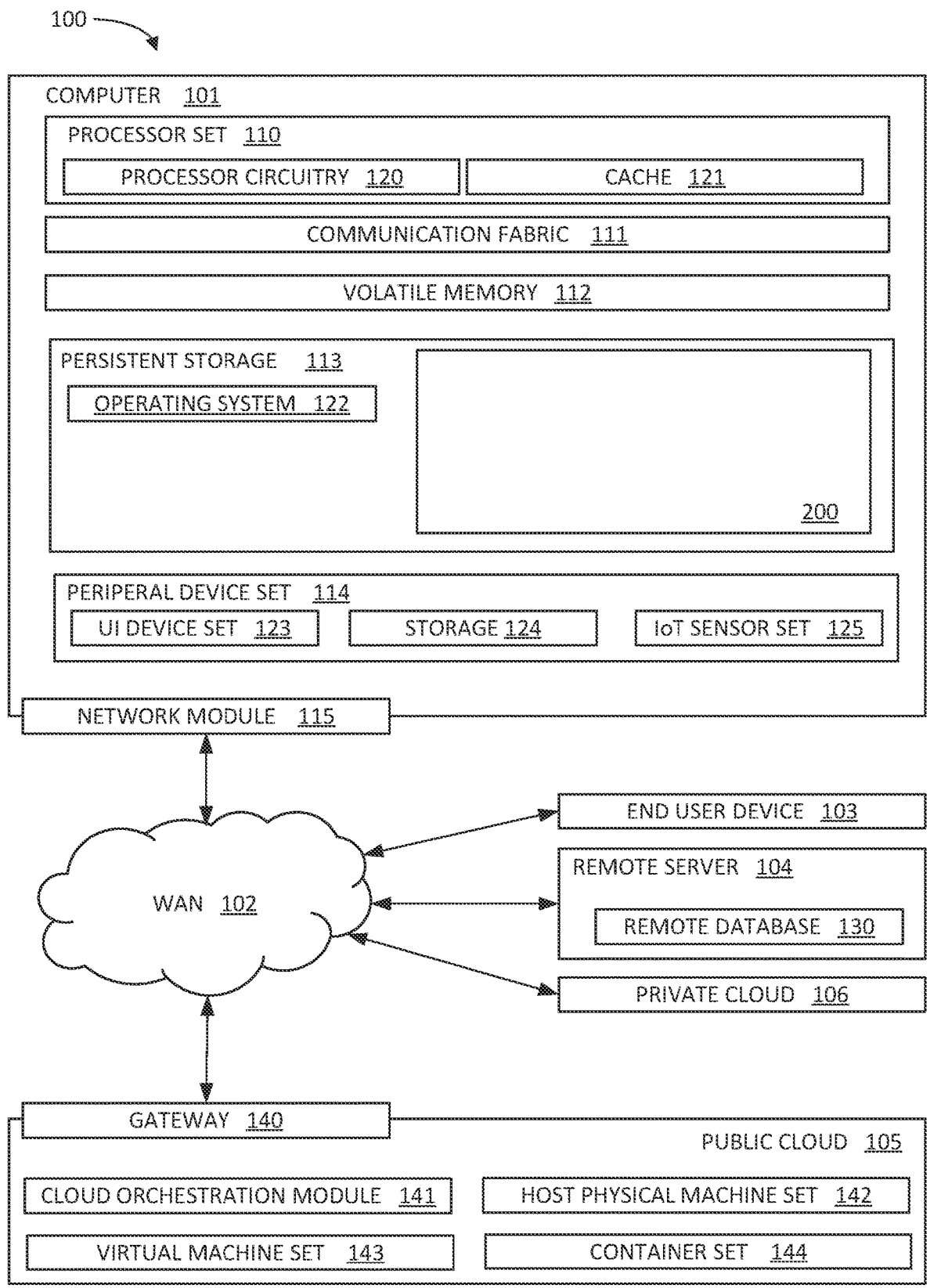
FIG. 9 depicts an example computing environment for execution of at least some of the computer code involved in determining, matching, and/or linking duplicate and/or corresponding electronic data records according to an embodiment of the disclosure.

Computing environment 100 of FIG. 9 contains an example of an environment for the execution of at least some of the computer code involved in performing the inventive methods, such as searching, determining, matching, and/or linking duplicate and/or corresponding records, including in an example embodiment new code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 9. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods. This code and its operation have been described in connection with the example MDM Module 820, including Matching Engine 845, for searching, determining, matching, and/or linking duplicate and/or corresponding electronic records.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, the method comprising:
    choosing for a target electronic data record, a group of one or more candidate electronic data records for comparison;
    selecting a plurality of a first set of two or more attributes of the target electronic data record to compare against a corresponding plurality of a first set of two or more attributes of the group of one or more candidate electronic data records;
    choosing a threshold for each of the selected plurality of the first set of two or more attributes of the target electronic data record;
    comparing each one of the selected plurality of the first set of two or more attributes of the target electronic data record to each one of the corresponding plurality of the first set of two or more attributes of one of the group of one or more candidate electronic data records;
    scoring each one of the comparisons of the selected plurality of the first set of two or more attributes of the target electronic data record to each one of the corresponding plurality of the first set of two or more attributes of the one of the group of one or more candidate electronic data records;
    determining whether the score of each one of the comparisons of the selected plurality one of the first set of two or more attributes of the target electronic data record to each of the corresponding plurality of the first set of two or more attributes of the one of the group of one or more candidate electronic data records is above the threshold chosen for each respective selected plurality of the first set of attributes;
    storing, in response to the score of at least one of the comparisons of the selected plurality of the first set of two or more attributes of the target electronic data record to the corresponding plurality of the first set of two or more attributes of the one of the group of one or more candidate electronic data records being above the threshold chosen for the respective selected plurality of the first set of attributes, each score of each one of the comparisons of the selected plurality of the first set of two or more attributes of the target electronic data record to each one of the corresponding plurality of the first set of two or more attributes of the one of the group of one or more candidate electronic data records; and linking, in response to the score of the at least one of the comparisons of the selected plurality of the first set of two or more attributes of the target electronic data record to the corresponding plurality of the first set of two or more attributes of one of the group of the one or more candidate electronic data records being above the threshold chosen for the respective selected plurality of the first set of attributes, the target record to the one of the group of one or more candidate electronic data records.

2. The method of claim 1, wherein choosing for a target electronic data record, a group of one or more candidate electronic data records for comparison, comprises applying a filter to electronic data records in an electronic data storage system to determine the group of one or more candidate electronic data records.

3. The method of claim 1, wherein choosing for a target electronic data record, a group of one or more candidate electronic data records for comparison, comprises:
calculating a hash value of one or more attributes of electronic data records in an electronic data storage system including the target electronic data record;
comparing the hash value of the one or more attributes of the target electronic data record to the hash value of the corresponding one or more attributes of the electronic data records in the electronic storage system;
wherein the group of one or more candidate electronic data records for the target electronic data record are the electronic data records that have a hash value for the one or more attributes that equals the hash value for the corresponding one or more attributes of the target electronic data record.

4. The method of claim 1, further comprising: determining a total score of all the comparisons of the selected plurality of the first set of attributes of the target electronic data record to the one of the group of one or more candidate electronic data records storing, in response to the total score of all the comparisons of the selected plurality of the first set of attributes of the target electronic data record to the one of the group of one or more candidate electronic data records being above a total threshold, the total score; and linking, in response to the total score being above the total threshold, the target record to the one of the group of one or more candidate electronic data records.

5. The method of claim 4, wherein the total threshold is a weighted total threshold where a threshold for at least one of the selected plurality of the first set of attributes is scaled.

6. The method of claim 1, further comprising configuring a sieve to apply to electronic records, wherein the sieve has a second set of one or more attributes and a corresponding threshold for each of the one or more attributes in the second set.

7. The method of claim 6, further comprising applying the sieve to one or more electronic data records in an electronic data storage system.

8. The method of claim 7, wherein applying the sieve to one or more electronic data records comprises: determining, for at least one of the one or more electronic data records, whether each one of the one or more attributes of the second set of one or more attributes is above the corresponding threshold for each of the one or more attributes in the second set.

9. The method of claim 8, further comprising identifying each electronic data record where each one of the one or more attributes of the second set of one or more attributes is above the corresponding threshold set for each of the one or more attributes in the second set.

10. The method of claim 7, wherein the first set of attributes is the same as the second set of attributes and the method further comprises:
selecting all the first set of attributes of the target electronic data record to compare against all the corresponding first set of attributes of the group of one or more candidate data records;
choosing a threshold for each of all of the first set of attributes of the target electronic data record;
comparing each one of all the first set of attributes of the target electronic data record to each one of all the corresponding first set of attributes of one of the group of one or more candidate electronic data records;
scoring each one of the comparisons of all the first set of attributes of the target electronic data record to all of the corresponding first set of attributes of the one of the group of one or more candidate electronic data records;
determining whether the score of each of the comparisons of all the first set of attributes of the target electronic data record to each of all of the corresponding first set of attributes of the one of the group of one or more candidate electronic data records is above the threshold chosen for each of all the first set of attributes;
storing, in response to the score of at least one of the comparisons of all the first set of attributes of the target electronic data record to all the corresponding first set of attributes of the one of the group of one or more candidate electronic data records being above the threshold chosen for the respective attribute in the first set of attributes, each score of each of the comparisons of all the first set of attributes of the target electronic data record to all the corresponding first set of attributes of the one of the group of one or more candidate electronic data records that is above the threshold chosen for the respective attribute in the first set of attributes; and
linking, in response to the score of at least one of the comparisons of all the first set of attributes of the target electronic data record to all the corresponding first set of attributes of the one of the group of one or more candidate electronic data records being above the threshold chosen for the respective attribute in the first set of attributes, the target record to the one of the group of one or more candidate electronic data records.

11. The method of claim 1, further comprising:
comparing each one of the plurality of the first set of two or more attributes of the target electronic data record to each one of the corresponding plurality of the first set of two or more attributes of a second one of the group of one or more candidate electronic data records;
scoring each of the comparisons of the selected plurality of the first set of two or more attributes of the target electronic data record to each of the corresponding plurality of the first set of two or more attributes of the second one of the group of one or more candidate electronic data records;
determining whether the score of each of the comparisons of the selected plurality of the first set of two or more attributes of the target electronic data record to each of the corresponding plurality of the first set of two or more attributes of the second one of the group of one or more candidate electronic data records is above a threshold chosen for each of the respective selected plurality of the first set of attributes;
storing, in response to the score of at least on of the comparisons of the selected plurality of the first set of two or more attributes of the target electronic data record to the corresponding plurality of first set of two or more attributes of the one of the group of second one or more candidate electronic data records being above the threshold chosen for each of the respective selected plurality of the first set of attributes, each score of each of the comparisons of the selected plurality of the first set of two or more attributes of the target electronic data record to each of the corresponding plurality of the first set of two or more attributes of the one of the group of one or more candidate electronic data records; and linking, in response to the score of at least one of the comparisons of the selected plurality of the first set of two or more attributes of the target electronic data record to the corresponding plurality of the first set of two or more attributes of one of the group of the one or more candidate electronic data records being above the threshold chosen for each of the respective selected plurality of the first set of attributes, the target record to the second one of the group of one or more candidate electronic data records.

12. A computer programing product comprising instructions that, when executed by at least one hardware processing element, configure the at least one hardware processing element to:

choose for a target electronic data record, a group of one or more candidate electronic data records for comparison;

select a plurality of a first set of two or more attributes of the target electronic data record to compare against a corresponding plurality of a first set of two or more attributes of the group of one or more candidate electronic data records;

choose a threshold for each of the plurality of the first set of two or more attributes of the target electronic data record;

compare each one of the selected plurality of the first set of two or more attributes of the target electronic data record to each one of the corresponding plurality of the first set of two or more attributes of one of the group of one or more candidate electronic data records;

score each of the comparisons of the selected plurality of the first set of two or more attributes of the target electronic data record to each one of the corresponding plurality of the first set of two or more attributes of the one of the group of one or more candidate electronic data records;

determine whether the score of each one of the comparisons of the selected plurality of the first set of two or more attributes of the target electronic data record to each one of the corresponding plurality of the first set of two or more attributes of the one of the group of one or more candidate electronic data records is above the threshold chosen for each respective selected plurality of the first set of attributes;

store, in response to the score of at least one of the comparisons of the selected plurality of the first set of two or more attributes of the target electronic data record to the corresponding plurality of the first set of two or more attributes of the one of the group of one or more candidate electronic data records being above the threshold chosen for each of the respective selected plurality of the first set of attributes, each score of each one of the comparisons of the selected plurality of the first set of two or more attributes of the target electronic data record to each one of the corresponding plurality of the first set of two or more attributes of the one of the group of one or more candidate electronic data records; and link, in response to the score of the at least one of the comparisons of the selected plurality of the first set of two or more attributes of the target electronic data record to the corresponding plurality of the first set of two or more attributes of one of the group of the one or more candidate electronic data records being above the threshold chosen for the respective selected plurality of the first set of attributes, the target record to the one of the group of one or more candidate electronic data records.

13. The computer program product according to claim 12, wherein the instructions that, when executed by the at least one hardware processing element, configure the at least one hardware processor to choose for a target electronic data record, a group of one or more candidate electronic data records for comparison, comprises instructions that, when executed by the at least one processing element, configure that at least one processing element to:

calculate a hash value of one or more attributes of electronic data records in an electronic data storage system including the target electronic data record; and compare the hash value of the one or more attributes of the target electronic data record to the hash value of the corresponding one or more attributes of the electronic data records in the electronic storage system, wherein the group of one or more candidate electronic data records for the target electronic data record are the electronic data records that have a hash value for the one or more attributes that equals the hash value for the corresponding one or more attributes of the target electronic data record.

14. The computer program product according to claim 13, further comprising instructions that, when executed by the at least one hardware processing element, configure the at least one hardware processing element to:

determine a total score of all the comparisons of the selected plurality of the first set of attributes of the target electronic data record to the one of the group of one or more candidate electronic data records;

store, in response to the total score of all the comparisons of the selected plurality of the first set of attributes of the target electronic data record to the one of the group of one or more candidate electronic data records being above a total threshold, the total score; and link, in response to the total score being above the total threshold, the target record to the one of the group of one or more candidate electronic data records.

15. The computer program product according to claim 14, wherein the instructions that, when executed by the at least one hardware processing element, configure the at least one hardware processing element to determine a total score of all the comparisons of the selected plurality of the first set of attributes of the target electronic data record to the one of the group of one or more candidate electronic records, comprise instructions that when, when executed by the at least one hardware processing element, configure the at least one hardware processing element to: determine the total threshold by scaling at least one threshold for at least one of the selected plurality of the first set of attributes.

16. The computer program product according to claim 12, further comprising instructions that, when executed by the at least one hardware processing element, configure the at least one hardware processing element to:

configure a sieve to apply to electronic records, wherein the sieve has a second set of one or more attributes and a corresponding threshold for each of the one or more attributes in the second set of one or more attributes; and apply the sieve to one or more electronic data records in an electronic data storage system, wherein applying the sieve to one or more electronic data records comprises: determining, for at least one of the one or more electronic data records, whether each one of the one or more attributes of the second set of one or more attributes is above the corresponding threshold for each of the one or more attributes in the second set.

17. The computer program product according to claim 12, further comprising instructions that, when executed by the at least one hardware processor, configure the at least one hardware processor to:

compare at least one of the first set of one or more attributes of the target electronic data record to at least one of the corresponding first set of one or more attributes of a second one of the group of one or more candidate electronic data records;

score the comparison of the at least one of the first set of one or more attributes of the target electronic data record to the at least one of the corresponding first set of one or more attributes of the second one of the group of one or more candidate electronic data records;

determine whether the score of the comparison of the at least one of the first set of one or more attributes of the target electronic data record to the at least one of the corresponding first set of one or more attributes of the second one of the group of one or more candidate electronic data records is above a first attribute threshold;

store, in response to the score of the comparison of the at least one of the first set of one or more attributes of the target electronic data record to the at least one of the corresponding first set of one or more attributes of the one of the group of second one or more candidate electronic data records being above the first attribute threshold, the score of the comparison of the at least one of the first set of one or more attributes of the target electronic data record to the at least one of the corresponding first set of one or more attributes of the one of the group of one or more candidate electronic data records; and link, in response to the score of the comparison of the at least one of the first set of one or more attributes of the target electronic data record to the at least one of the corresponding first set of one or more attributes of one of the group of the one or more candidate electronic data records being above the first attribute threshold, the target record to the second one of the group of one or more candidate electronic data records.

18. A system comprising:

a processor; and a data management module wherein the database management module configures the processing element to:

choose for a target electronic data record, a group of one or more candidate electronic data records for comparison;

select a plurality of a first set of two or more attributes of the target electronic data record to compare against a corresponding plurality of a first set of two or more attributes of the group of one or more candidate electronic data records;

choose a threshold for each of the selected plurality of the first set of two or more attributes of the target electronic data record;

compare each one of the first set of two or more attributes of the target electronic data record to each one of the corresponding plurality of the first set of two or more attributes of one of the group of one or more candidate electronic data records;

score each one of the comparisons of the selected plurality of the first set of two or more attributes of the target electronic data record to each one of the corresponding plurality of the first set of two or more attributes of the one of the group of one or more candidate electronic data records;

determine whether the score of each one of the comparisons of the first set of two or more attributes of the target electronic data record to each one of the corresponding plurality of the first set of two or more attributes of the one of the group of one or more candidate electronic data records is above the threshold chosen for each of the respective plurality of the first set of attributes;

store, in response to the score of at least one of the comparisons of the selected plurality of the first set of two or more attributes of the target electronic data record to the corresponding plurality of the first set of two or more attributes of the one of the group of one or more candidate electronic data records being above the threshold chosen for the respective selected plurality of the first set of attributes, each score of each one of the comparisons of the selected plurality of the first set of two or more attributes of the target electronic data record to each one of the corresponding plurality of the first set of two or more attributes of the one of the group of one or more candidate electronic data records; and link, in response to the score of the at least one of the comparisons of the selected plurality of the first set of two or more attributes of the target electronic data record to the corresponding plurality of the first set of two or more attributes of one of the group of the one or more candidate electronic data records being above the threshold chosen for the respective selected plurality of the first set of attributes, the target record to the one of the group of one or more candidate electronic data records.

* * * * *